Oct. 11, 1938.  B. S. AIKMAN  2,132,915
EMERGENCY VALVE DEVICE
Filed May 26, 1936
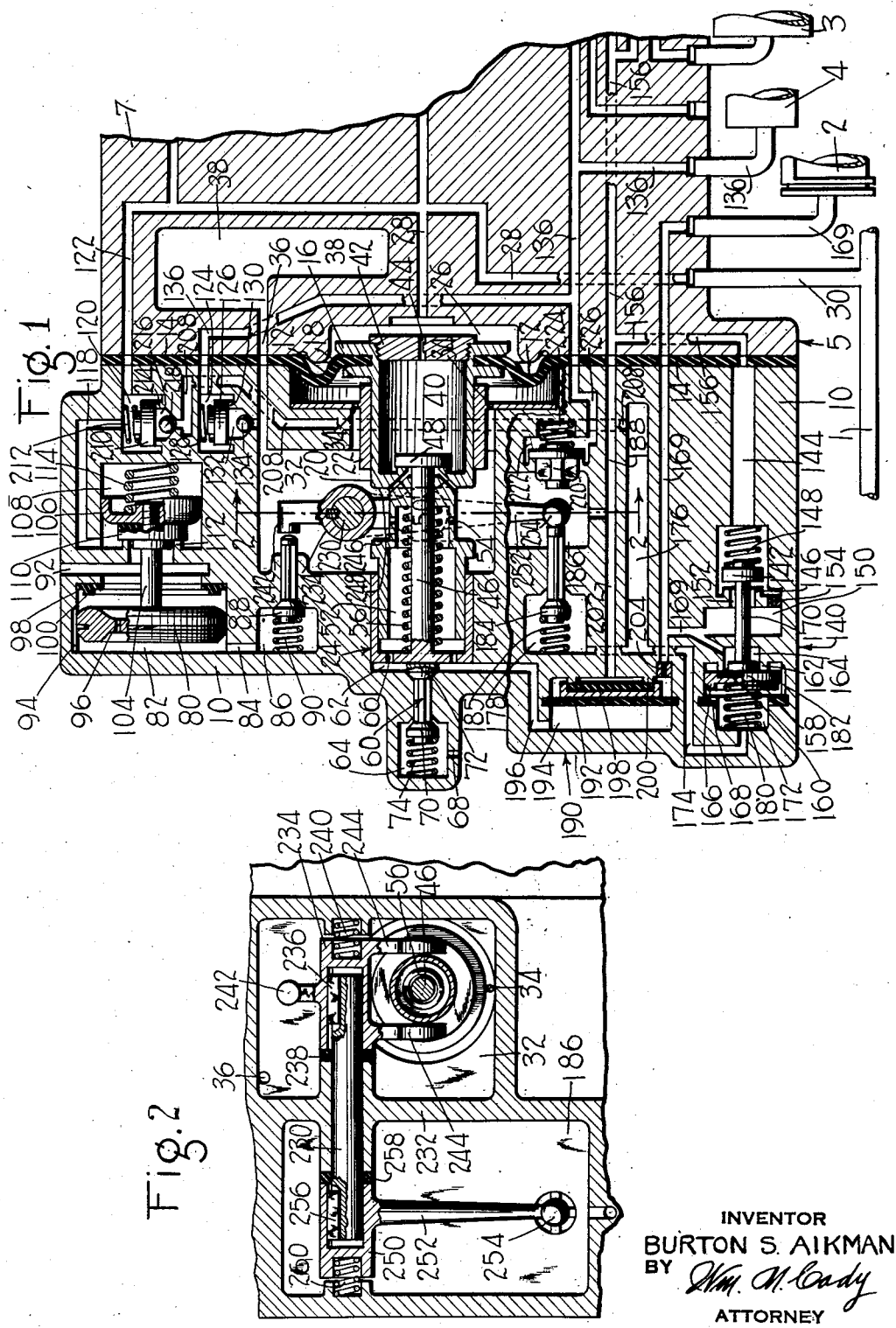
INVENTOR
BURTON S. AIKMAN
BY Wm. M. Cady
ATTORNEY Patented Oct. 11, 1938

2,132,915

UNITED STATES PATENT OFFICE 2,132,915

EMERGENCY VALVE DEVICE

Burton S. Aikman, Wilkinsburg, Pa., assignor to The Westinghouse Air Brake Company, Wilmerding, Pa., a corporation of Pennsylvania Application May 26, 1936, Serial No. 81,863

22 Claims. (Cl. 303—42)

This invention relates to a fluid pressure brake equipment and more particularly to an improved brake controlling valve device.

In some types of brake systems heretofore developed there have been provided emergency valve devices subject to the opposing pressures of the fluid in the brake pipe and of the fluid in a pressure chamber for venting fluid under pressure from the brake pipe and for supplying fluid under pressure to the brake cylinder on a reduction in the pressure of the fluid in the brake pipe at an emergency rate.

These emergency valve devices have incorporated means for releasing fluid under pressure from the pressure chamber during a reduction in the pressure of the fluid in the brake pipe at a service rate in order to prevent the development of sufficient difference in the pressure of the fluid in the brake pipe and in the pressure chamber to cause the emergency valve device to move to the application position.

If for any reason the operating elements of the emergency valve device should offer a high frictional resistance to movement, on a reduction in the pressure of the fluid in the brake pipe at a service rate the valve device may not move to the position to release fluid under pressure from the pressure chamber, and because of the continuing reduction in the pressure of the fluid in the brake pipe the pressure differential between the pressure chamber and the brake pipe will increase and will eventually overcome the resistance to movement of the valve device. The pressure differential between the brake pipe and the pressure chamber may then be so great as to cause the valve device to move to the application position, thereby producing an undesired emergency application of the brakes.

It is an object of the present invention to provide an improved emergency valve device.

A further object of the invention is to provide an emergency valve device which employs a diaphragm in place of the piston which is employed in the valve devices now in use.

Another object of the invention is to provide an emergency valve device which employs poppet type valves instead of the slide valves which are employed in the valve devices now in use.

A further object of the invention is to provide an emergency valve device in which the sliding and friction areas in the device are reduced to a minimum, whereby the valve device is very sensitive to variations in the pressures to which it is intended to respond.

Another object of the invention is to provide an emergency valve device responsive to differences in the pressure of the fluid in the brake pipe and in a pressure chamber and which is so constructed that it will always operate in response to substantially the same pressure differences.

A further object of the invention is to provide an emergency valve device which will require a minimum of attention to keep it in proper working condition.

Another object of the invention is to provide an emergency valve device which is constructed and arranged so that it may be employed in place of the valve devices now in use and which operates in the same manner as the valve device which it replaces.

Other objects of the invention and features of novelty will be apparent from the following description taken in connection with the accompanying drawing, in which Fig. 1 is a fragmentary view, largely in section, of a brake equipment incorporating an emergency valve device embodying this invention, and Fig. 2 is a sectional view taken substantially along the line 2—2 of Fig. 1.

Referring to the drawing, the brake equipment therein illustrated comprises a brake pipe 1, a brake cylinder 2, an auxiliary reservoir 3, an emergency reservoir 4, and a brake controlling valve device indicated generally by the reference numeral 5.

The brake controlling valve device 5 comprises a pipe bracket section 7 having a mounting face formed thereon against which is secured the emergency valve device 10 provided by this invention. The pipe bracket section has formed thereon another mounting face, not shown, against which is secured the service portion of the brake controlling valve device, this portion not being shown in the drawing.

The pipe bracket section 7 and the service portion, not shown, of the brake controlling valve device 5 are identical in construction and operation with the corresponding parts of the brake controlling valve device shown in U. S. Patent No. 2,031,213, issued February 18, 1936, to Clyde C. Farmer, while the emergency valve device 10 provided by this invention is intended to operate in place of the emergency portion employed in the brake controlling valve device shown in the above identified patent.

The emergency valve device 10 comprises a movable abutment in the form of a diaphragm 12 which may be formed integral with a gasket 14 which is clamped between the body of the emergency valve device 10 and the pipe bracket section 7.

The central portion of the diaphragm 12 is secured between the flanges 16 and 18 on a stem 20. One end of the stem 20 is slidably supported in a bore in a guide member 22 which is secured to the body of the emergency valve device, while the other end of the stem 20 is slidably supported in a bore in a valve device 24 which is reciprocable in a bore in the body of the emergency valve device 10.

The diaphragm 12 is subject on one side to the pressure of the fluid in a chamber 26 which communicates by way of a passage 28 in the pipe bracket section 7 and the branch pipe 30 with the brake pipe 1.

The diaphragm 12 is subject on the other side to the pressure of the fluid in the chamber 32 which is in constant communication with the area on the face of the diaphragm 12 by way of passages 34 through the guide member 22. The chamber 32 is also in constant communication by way of a passage 36 with a quick action chamber 38 formed in the pipe bracket section 7.

The stem 20 has a chamber 40 formed therein and one end of this chamber is closed by means of a threaded plug 42 through which extends a restricted passage 44 which communicates with the chambers 26 and 40.

The valve device 24 includes a poppet valve 48 carried by a stem 46 which is mounted in a bore in the stem 20, the valve 48 being positioned in the chamber 40 and being adapted to seat on a seat formed on the stem 20 so as to control communication between the chamber 40 and the chamber 32 through passages 50.

The stem 20 has a chamber 52 formed therein which is in constant communication by way of passages 54 with the chamber 32.

A spring 56 is positioned in the chamber 52 and extends between the valve device 24 and a shoulder on the stem 20 and yieldingly urges the valve device 24 in a direction to move the poppet valve 48 to the seated position.

The emergency valve device 10 has associated therewith a double seating poppet valve device indicated generally by the reference numeral 60 and controlling communication between a chamber 62 on the face of the valve device 24 and a chamber 64. The chamber 62 is in constant communication by way of a passage 66 with the chamber 52 in the stem 20, while the chamber 64 communicates with the atmosphere by way of a restricted passage 68.

The double seating poppet valve device 60 comprises a fluted stem mounted in a bore in the body of the emergency valve device 10 and having at one end a poppet valve 70 which is adapted to seat upon a seat surrounding the bore in which the stem is mounted, and having at the other end a poppet valve 72 which is adapted to seat upon a seat surrounding this end of the bore in which the stem of the valve device is mounted.

The double seating poppet valve device 60 has associated therewith a spring 74 which yieldingly urges it to the right as viewed in Fig. 1 of the drawing, so as to cause the valve 70 to engage its seat. The spring 74 and the spring 56 are proportioned so that the spring 74 is substantially weaker than the spring 56.

The valve 72 of the poppet valve device 60 is adapted to be engaged by the valve device 24 so that on movement of the valve device 24 to the left, as viewed in Fig. 1 of the drawing, the poppet valve device 60 is moved against the spring 74 until the valve 72 is moved into engagement with its seat.

This emergency valve device includes a vent valve mechanism operative on the supply of fluid under pressure thereto to vent fluid from the brake pipe. As shown in the drawing this valve mechanism comprises a piston 80 which is mounted in a bore in the body of the emergency valve device 10, and which has at one side thereof a chamber 82 which is constantly connected by way of a passage 84 with a valve chamber 86 in which is mounted a poppet valve 88 which is urged to the seated position by means of a coil spring 90. The area on the opposite side of the piston 80 is open to the atmosphere by way of a passage 92, while the body of the emergency valve device 10 has a groove 94 formed therein which in one position of the piston 80 extends around the piston so as to establish communication between the chamber 82 and the atmospheric passage 92.

The piston 80 has a restricted passage 96 extending therethrough, while the body of the emergency valve device 10 has an annular gasket 98 associated therewith and carrying a seat rib 100 which is adapted to be engaged by a face of the piston 80 to prevent the escape of fluid under pressure from the chamber 82 around the periphery of the piston in one position of the piston.

The piston 80 has a stem 104 formed integral therewith, while a vent valve 106 is secured on the stem 104. The vent valve 106 is mounted in a chamber 108 and carries a sealing gasket 110 which is adapted to engage a seat rib 112. The vent valve 106 is urged to the seated position by means of a coil spring 114.

The chamber 108 in which the vent valve 106 is mounted is constantly connected by way of a passage 118 with a chamber 120, and this chamber is constantly connected by way of a passage 122 with the passage 28 to which is connected the branch pipe 30 leading to the brake pipe 1. The chamber 108, therefore, is constantly connected to the brake pipe 1 and to the chamber 26 on the face of the diaphragm 12.

The body of the emergency valve device 10 has a chamber 124 formed therein in which is mounted a spill-over check valve 126 which is urged by means of a spring 128 into engagement with a seat rib 130. The chamber 132 within the seat rib 130 contains a ball check valve 134 which is adapted to seat upon a seat surrounding a passage which communicates with the passage 36 and thereby with the chamber 32 and the quick action chamber 38. The chamber 124 is constantly connected by way of a passage and pipe 136 with the emergency reservoir 4.

The emergency valve device provided by this invention has associated therewith an inshot valve device indicated generally by the reference numeral 140 which operates on an emergency application of the brakes to reduce the rate of flow of fluid to the brake cylinder after the pressure of the fluid in the brake cylinder has increased to a predetermined value.

As shown in the drawing, the inshot valve device 140 comprises a valve 142 which is mounted in a chamber 144 and which is urged towards a seat rib 146 by means of a coil spring 148 so as to control communication between the chamber 144 and a chamber 150 by way of a passage 152 of relatively large flow capacity.

A passage 154 of restricted flow capacity is provided between the chamber 144 and the chamber 150 and which by-passes the passage controlled by the valve 142.

The chamber 144 is constantly connected by way of a passage 156 with a port in the seat of the main slide valve of the service portion of the valve device (not shown).

The body of the emergency valve device 10 has a bore therein in which is mounted a piston 158 having secured on a face thereof a sealing gasket 160 which is adapted to seat upon a seat rib 162 surrounding a chamber 164 which is in constant communication with the chamber 150.

The other face of the inshot valve piston 158 has an annular seat rib 166 formed thereon which is adapted to engage a sealing gasket 168 associated with the body of the valve device.

The chambers 164 and 150 are in constant communication with the brake cylinder 2 by way of a passage and pipe 169.

The inshot valve piston 158 has secured thereto a stem 170 and the valve 142 is carried by this stem.

The chamber 172 within the seat rib 166 on the face of the inshot valve piston 158 is constantly connected by way of a passage 174 with an inshot piston volume 176 and with a valve chamber 178.

A spring 180 is mounted in the chamber 172 and yieldingly urges the inshot valve piston 158 to the right, as viewed in Fig. 1 of the drawing, so that the sealing gasket 160 engages the seat rib 162. The spring 180 and the spring 148 are proportioned so that the spring 180 exerts a substantially greater force on the inshot valve piston 158 than does the spring 148 which operates through the valve 142 and the stem 170.

The body of the emergency valve device 10 has a groove 182 cut therein which communicates with the area outwardly of the seat rib 166 on the piston 158 and the area on the opposite side of the piston outwardly of the seat rib 162.

The emergency valve device 10 includes valve means for controlling the supply of fluid under pressure from the brake cylinder 2 to the chamber 172 on the face of the inshot valve piston 158 in order to regulate the operation of the inshot valve device.

This valve means comprises a poppet valve 184 mounted in the chamber 178 and having a fluted stem which is positioned in a passage extending from the chamber 178 to a chamber 186 which is in constant communication with the brake cylinder 2 by way of a passage 188 and the passage 156 leading to the chamber 144 of the inshot valve mechanism. The valve 184 is yieldingly urged to the seated position by means of a spring 185.

The emergency valve device provided by this invention includes a timing valve device which operates during an emergency application of the brakes to increase the rate of flow of fluid under pressure to the brake cylinder after a time interval.

As shown in the drawing the timing valve device, which is indicated generally by the reference numeral 190, comprises a movable abutment in the form of a diaphragm 192, which is subject on one side to the pressure of the fluid in a chamber 194, which is in constant communication by way of a passage 196 with the chamber 32.

The diaphragm 192 has mounted on the other face thereof a sealing gasket 198 which is adapted to engage a seat rib 200. The area within the seat rib 200 is connected by way of a passage 202 with the passage 188, and thereby to the passage 156 which communicates with a port in the seat of the main slide valve of the service portion of the brake controlling valve device.

The area outwardly of the seat rib 200 communicates with the brake cylinder 2 by way of a choke 204 and the passage and pipe 169.

When the valve 184 is in the open position the brake cylinder 2 is connected to the inshot piston volume 176 and a communication in the form of a passage 208 is provided through which fluid under pressure may flow from the volume 176 to the brake pipe. This passage has associated therewith an accelerated release check valve to prevent back flow of fluid from the brake pipe to the brake cylinder through this passage.

As shown in the drawing the accelerated release check valve comprises a valve 210 which is mounted in the chamber 120 and is urged by means of a spring 212 into engagement with a seat rib 214 surrounding a chamber 216 in which is mounted a ball check valve 218 which is adapted to seat upon a seat which surrounds the end of the passage 208.

The valve device provided by this invention includes a poppet valve to control the supply of fluid under pressure from the emergency reservoir 4 to the brake cylinder 2. As shown in the drawing there is a poppet valve 220 which is mounted in a chamber 222 and which controls communication between the chamber 222 and the chamber 186. The valve 220 is urged to the seated position by means of a spring 224, while the chamber 222 is constantly connected by way of a passage 226 with the passage 136 and thereby with the emergency reservoir 4.

This emergency valve device includes means operated by the diaphragm 12 for controlling the valves 88, 184 and 220. This means comprises a shaft 230 which is journaled in a bore which extends through a wall 232 which separates the chamber 32 and the chamber 186. The shaft 230 is arranged to closely fit the bore in which it is mounted and the portion of the wall 232 through which this bore extends is preferably relatively thick so as to provide a long bearing surface for the shaft 230 and thereby reduce to a minimum the flow of fluid between the chambers 32 and 186.

The end of the shaft 230 which projects into the chamber 32 has mounted thereon a rocker arm indicated generally by the reference numeral 234. The rocker arm 234 has a hub portion having a bore therein which is closed at its inner end and into which extends the end of the shaft 230. The rocker arm 234 is secured on the shaft 230 by means of a key 236 which prevents relative rotative movement between the rocker arm 234 and the shaft 230, but permits movement of these members relative to each other axially of the shaft 230.

A sealing gasket 238 is mounted on the shaft 230 between the rocker arm 234 and the wall 232, while the rocker arm 234 is urged by means of a spring 240 against the sealing gasket 238 so as to compress this gasket between the rocker arm 234 and the wall 232.

The rocker arm 234 has formed integral therewith an arm 242 which is adapted to engage the end of the stem of the valve 88 to move this valve against the spring 90 associated therewith.

The rocker arm 234 also has formed integral therewith spaced arms 244 having rounded end portions which extend into an annular groove formed on the stem 20. On movement of the stem 20 in one direction the arms 244 are engaged by a shoulder 246 on the stem 20, and on movement of the stem 20 in the other direction the arms 244 are engaged by a shoulder 248 formed on the stem 20. The rounded end portions of the arms 244 are preferably proportioned so as to substantially fill the space between the shoulders 246 and 248 on the stem 20 so that there will be substantially no movement of the stem 20 and the arms 244 relative to each other.

The end of the shaft 230 which projects into the chamber 186 has secured thereon a rocker arm 250 which has formed integral therewith an arm 252 which terminates in a spherical end portion 254 which is positioned between the end of the stem associated with the valve 184 and the stem associated with the valve 220, as is best shown in Fig. 1 of the drawing.

The rocker arm 250 has a hub portion having a bore therein which is closed at the inner end and into which the end of the shaft 230 extends. A key 256 is provided and secures the rocker arm 250 on the shaft 230 so as to prevent relative rotative movement therebetween, but to permit movement of the rocker arm 250 axially of the shaft 230. A sealing gasket 258 is mounted on the shaft 230 between the rocker arm 250 and the wall 232 and the rocker arm 250 is urged by means of a spring 260 to the right, as viewed in Fig. 2 of the drawing, so as to compress the gasket 258 between the rocker arm 250 and the wall 232 and thereby prevent the flow of fluid between the chamber 186 and the bore in which the shaft 230 is mounted.

The various parts of the emergency valve device provided by this invention are arranged and proportioned so that when the diaphragm 12 is in the normal release position, which is the position in which it is shown in Fig. 1 of the drawing, the valve 48, which controls the flow of fluid from the brake pipe 1 to the chamber 32, is seated, and so that the poppet valve device 60, which controls the release of fluid under pressure from the chamber 32 to the atmosphere, is in the position in which the valve 72 engages its seat to cut off the release of fluid from the chamber 32.

In this position of the diaphragm 12, the valve 184 is held away from its seat by the arm 252 of the rocker arm 250, thereby establishing communication between the chamber 186 and the chamber 178.

At this time the end 254 of the arm 252 is out of engagement with the valve 220, being spaced therefrom a short distance, as is clearly shown in Fig. 1 of the drawing, and the valve 220 is held in the seated position by the spring 224.

In this position of the diaphragm 12 the rocker arm 234 is in a position in which the arm 242 thereof is spaced from the end of the stem of the valve 88 a short distance, and the valve 88, which controls the supply of fluid under pressure from the chamber 32 to the chamber 82 on the face of the vent valve piston 80, is held in the seated position by means of the spring 90.

When the brake pipe 1 and the chamber 32 are at atmospheric pressure the diaphragm 12 is held by the spring 185 operating through the valve 184 and the arm 252 of the rocker arm 250 in a position a short distance to the right as viewed in Fig. 1 of the drawing, from the position in which it is shown in the drawing, and the valve 184 is held in the seated position. In this position of the diaphragm 12 and the stem 20 the arm 242 of the rocker arm 234 engages and presses against the end of the valve 88 and holds this valve away from its seat against the spring 90. The spring 185 associated with the valve 184 and the spring 90 associated with the valve 88 are proportioned so that the spring 185 is able to overcome the spring 90 and hold the valve 184 in the seated position against the opposing force of the spring 90.

In this position of the diaphragm 12 and the stem 20 the poppet valve device 60 is held by the spring 74 in a position in which the valve 72 is out of engagement with its seat and in which the valve 70 is in engagement with its seat or is positioned adjacent thereto.

In initially charging the equipment fluid under pressure is supplied to the brake pipe 1, and it flows therefrom by way of the branch pipe 30 and the passage 28 in the pipe bracket section 7 to the chamber 26 on the face of the diaphragm 12 and increases the pressure of the fluid in this chamber. Fluid under pressure supplied to the chamber 26 flows therefrom through the restricted port 44 to the chamber 40 in the stem 20.

On an increase in the pressure of the fluid in the chamber 26 sufficient to overcome the opposing force of the spring 185, the diaphragm 12 is flexed so as to cause the stem 20 to move to the left as viewed in Fig. 1 of the drawing, to the normal release position, and on this movement of the stem 20 the rocker arm 234 is operated to move the arm 242 away from the end of the stem of the valve 88 and permit this valve to be moved to the seated position by the spring 90, while the arm 252 of the rocker arm 250 is moved against the end of the stem of the valve 184 and moves this valve away from its seat against the spring 185.

In addition, on this movement of the diaphragm 12 and the stem 20, the valve device 24 is moved against the poppet valve device 60 and moves this valve device against the spring 74 so that the valve 72 is moved to the seated position to cut off communication between the chamber 32 and the atmosphere by way of the chamber 64 and the port 68.

On a further increase in the pressure of the fluid in the chamber 26 the diaphragm 12 flexes so as to cause the stem 20 to move to the left, as viewed in Fig. 1 of the drawing, away from the normal release position to an inner release position against the opposing force exerted by the spring 56.

On this movement of the stem 20 the spring 56 is compressed somewhat, and this force is transmitted through the valve device 24, which presses against the valve 72 of the poppet valve device 60, so as to more firmly press the valve 72 against its seat. On this movement of the stem 20 the seat carried by the stem 20 moves away from the valve 48, thereby opening communication between the chamber 40 and the chamber 32 through the passages 50, and fluid under pressure supplied to the chamber 40 from the chamber 26 flows therefrom through the passages 50 to the chamber 32, and from the chamber 32 fluid under pressure flows by way of the passage 36 to the quick action chamber 38. The rate of increase in the pressure of the fluid in the chamber 32 and in the quick action chamber 38 is relatively slow, however, because of the restricted rate at which fluid under pressure may flow from the chamber 26 through the restricted passage 44.

In addition, on this movement of the stem 20 the rocker arm 234 is turned so as to move the arm 242 away from the end of the stem of the valve 88, while this movement of the rocker arm 234 is transmitted through the shaft 230 to turn the rocker arm 250 so that the spherical end portion 254 on the arm 252 presses against the end of the stem of the valve 184 and moves this valve against the spring 185 farther away from its seat. By this movement of the rocker arm 250 the spherical end portion 254 is moved farther away from the valve 220.

On an increase in the pressure of the fluid in the chamber 32 fluid under pressure flows therefrom through the ports 34 in the guide member 22 to the area on the face of the diaphragm 12. Fluid under pressure supplied to the chamber 32 also flows therefrom through the ports 54 to the chamber 52 within the stem 20, and from this chamber it flows through the ports 66 to the chamber 62 on the face of the valve device 24. As the valve 72 of the poppet valve device 60 is in the seated position at this time the release of fluid under pressure from the chamber 32 is cut off. Fluid under pressure supplied to the chamber 62 flows therefrom by way of the passage 196 to the chamber 194 on the face of the diaphragm 192 of the timing valve device 190 and exerts a force on this diaphragm to hold the sealing gasket 198 in engagement with the seat rib 200.

After a time interval the pressure of the fluid in the chamber 32 will increase substantially to the pressure of the fluid in the chamber 26 on the opposite face of the diaphragm 12, and when the pressure of the fluid in the chamber 32 approaches the pressure of the fluid in the chamber 26 the stem 20 and the diaphragm 12 will be moved to the right, as viewed in Fig. 1 of the drawing, away from the inner release position by the spring 56, assisted by the spring 185.

When the pressure of the fluid in the chamber 32 has increased substantially to the same pressure as is present in the chamber 26 the spring 56 will have expanded sufficiently to move the stem 20 to the right so that the seat carried thereby will engage the valve 48 to cut off communication between the chamber 40 and the chamber 32 through the passages 50, thereby cutting off the supply of fluid under pressure to the chamber 32 from the chamber 40 and chamber 26, and cutting off the further increase in the pressure of the fluid in the chamber 32.

On the return of the stem 20 from the inner release position to the normal release position the valve 184 will be moved by the spring 185 towards its seat substantially to the position in which it is shown in Fig. 1 of the drawing, in which position it is out of engagement with its seat so as to permit communication between the chamber 186 and the chamber 178.

In addition, on this movement of the stem 20 the rocker arm 234 will be turned so as to move the arm 242 towards the valve 88, while the end 254 of the arm 252 of the rocker arm 250 will be moved towards the valve 220.

If for any reason the pressure of the fluid in the chamber 32 increases more rapidly than the pressure of the fluid in the emergency reservoir 4 fluid under pressure from the chamber 32 will flow past the ball check valve 134 to the chamber 132, and will move the spill-over check valve 126 away from the seat rib 130 against the spring 128. This fluid will then flow to the chamber 124 and therefrom by way of the passage and pipe 136 to the emergency reservoir 4, thereby reducing the pressure of the fluid in the chamber 32 and increasing the pressure of the fluid in the emergency reservoir 4.

When the pressure of the fluid in the chamber 32 has been reduced substantially to the pressure of the fluid in the emergency reservoir 4, the spill-over check valve 126 is moved into engagement with the seat rib 130 by the spring 128, thereby cutting off the flow of fluid from the chamber 32 to the emergency reservoir 4 and preventing back flow of fluid from the emergency reservoir 4 to the chamber 32.

In addition, on the supply of fluid under pressure to the brake pipe in initially charging the equipment, the service portion of the brake controlling valve device 5 operates as described in detail in the above identified patent to open a communication through which fluid under pressure may be supplied from the brake pipe 1 to the auxiliary reservoir 3 and the emergency reservoir 4.

On a reduction in the pressure of the fluid in the brake pipe at a service rate to effect a service application of the brakes there will be a gradual reduction in the pressure of the fluid in the chamber 26 on the face of the diaphragm 12.

There will be a corresponding reduction in the force exerted on the diaphragm 12 by the fluid under pressure in the chamber 26 and the fluid under pressure in the chamber 32 on the opposite side of the diaphragm 12, assisted by the springs 74 and 185, will exert a greater force on this diaphragm than is exerted by the fluid under pressure in the chamber 26. As a result the diaphragm 12 will be moved to the right, as viewed in Fig. 1 of the drawing, thereby moving the stem 20 to the right.

On this movement of the stem 20 the seat on the stem 20 will press against the valve 48 of the valve device 24 and will move the valve device 24 to the right as viewed in Fig. 1 of the drawing, thereby permitting the valve 72 of the poppet valve device 60 to be moved away from its seat by the spring 74.

On this movement of the stem 20 the arm 252 of the rocker arm 250 is moved in a counterclockwise direction as viewed in Fig. 1 of the drawing, thereby permitting the valve 184 to be moved towards its seat by the spring 185 associated therewith.

On movement of the valve 72 of the poppet valve device 60 away from its seat, fluid under pressure will flow from the chamber 32 through the passages 54 to the chamber 52 within the stem 20, and therefrom through the passages 66 to the chamber 62 on the face of the valve device 24, and thence past the unseated valve 72 to the chamber 64 from which it may flow to the atmosphere through the restricted passage 68.

The restricted passage 68 is proportioned so that the rate of flow of fluid through this passage is such that it permits the pressure of the fluid in the valve chamber 32 and the quick action chamber 38 to be reduced substantially as rapidly as the pressure of the fluid in the brake pipe 1 and in the chamber 26 is reduced during a reduction in brake pipe pressure at a service rate.

After a certain amount of movement of the diaphragm 12 to the right, as viewed in Fig. 1 of the drawing, the rocker arm 234 is turned in a counterclockwise direction an amount sufficient to cause the arm 242 to engage the end of the stem of the valve 88 so that further movement of the rocker arm 234 and the stem 20 is resisted by the spring 90 operating through the poppet valve 88.

The valve 70 of the poppet valve device 60 is arranged so that on movement of the arm 242 of the rocker arm 234 into engagement with the end of the stem of the valve 88 it will be located adjacent to, but out of engagement with its seat so as to permit fluid under pressure to continue to flow from the chamber 32 to the chamber 64 and thence to the atmosphere.

If for any reason, the rate at which the pressure of the fluid in the brake pipe 1 is reduced momentarily exceeds the normal service rate of reduction in brake pipe pressure so that the pressure of the fluid in the chamber 26 is reduced more rapidly than the pressure of the fluid in the chambers 32 and 38 is reduced by operation of the poppet valve device 60, the force exerted on the diaphragm 12 by the fluid under pressure in the chamber 32 will exceed the force exerted on this diaphragm by the fluid under pressure in the chamber 26.

The fluid under pressure in the chamber 32, therefore, will tend to move the diaphragm 12 to the right, as viewed in Fig. 1 of the drawing, so as to permit the poppet valve device 60 to be moved by the spring 74 to the position in which the valve 70 engages its seat to cut off the release of fluid under pressure from the chamber 32. However, this movement of the diaphragm 12 and the stem 20, which is rigidly secured thereto, is opposed by the spring 90 operating through the poppet valve 88 and the arm 242 of the rocker arm 234. The arm 242 engages the end of the stem of the valve 88 before the valve 70 of the poppet valve device 60 is moved to the seated position, and the spring 90 will prevent movement of the diaphragm 12 to a position to permit the valve 70 of the poppet valve device 60 to be moved to the seated position by the spring 74 to cut off the release of fluid from the chamber 32 until a substantial differential is created between the pressures in the chamber 26 and the chamber 32.

The diaphragm 12, therefore, will not move to the position to permit the poppet valve device 60 to cut off the release of fluid under pressure from the chamber 32 in response to a momentary reduction in the pressure of the fluid in the brake pipe at a rate exceeding the service rate.

On a reduction in the pressure of the fluid in the brake pipe at a service rate, the service portion (not shown) of the brake controlling valve device 5 operates in a manner described in detail in the above identified patent to cut off the communication through which fluid is supplied from the brake pipe to the auxiliary reservoir, and to supply fluid under pressure from the auxiliary reservoir 3 to the passage 156 leading to the chamber 144 of the inshot valve device 140.

Fluid under pressure supplied to the chamber 144 flows therefrom past the seat rib 146 and through the passage 152 to the chamber 150, from which it flows to the chamber 164 within the seat rib 162 on the face of the inshot valve piston 158, and by way of the passage and pipe 169 to the brake cylinder 2, so that the brake cylinder is supplied with fluid under pressure to effect a service application of the brakes.

Fluid under pressure supplied by the service portion of the valve device 5 to the passage 156 also flows therefrom through the passage 188 to the chamber 186. Fluid under pressure supplied to the chamber 186 flows therefrom through the passage in which the fluted stem of the valve 184 is located and past the valve 184, which at this time is held away from its seat by the end 254 of the arm 252 of the rocker arm 250, to the chamber 178 from which it flows by way of the passage 174 to the chamber 172 on the spring side of the inshot valve piston 158, and through the groove 182 to the area outwardly of the seat rib 162 on the opposite face of the inshot valve piston 158.

The pressures in the chambers on the opposite sides of the inshot valve piston 158 will, therefore, be substantially equal and the inshot valve piston 158 will thus be held in engagement with the seat rib 162 by the spring 180, and will hold the valve 142 away from the seat rib 146 so as to permit fluid under pressure to flow at a rapid rate from the passage 156 and the chamber 144 through the passage 152 to the brake cylinder.

The service portion of the brake controlling valve device will operate in the manner described in detail in the above identified patent to supply fluid under pressure to the brake cylinder 2 until the pressure of the fluid in the auxiliary reservoir 3 is reduced substantially to the pressure to which the fluid in the brake pipe has been reduced.

Fluid under pressure supplied from the chamber 178 to the passage 174 also flows to the inshot piston volume 176 and therefrom by way of the passage 208 to the accelerated release check valves 218 and 210. The accelerated release check valve 210 is held in engagement with the seat rib 214 by the spring 212 and by the pressure of the fluid in the chamber 120, which is connected to the brake pipe 1 by way of the passage 122, the passage 28 and the branch pipe 30. During normal service applications of the brakes the pressure of the fluid in the brake pipe 1 will exceed the pressure of the fluid in the brake cylinder 2, and hence the fluid under pressure supplied to the passage 208 will be unable to move the accelerated release check valve 210 away from the seat rib 214 against the opposing forces of the fluid under pressure in the chamber 120 and the spring 212.

Fluid under pressure supplied by the service portion of the valve device to the passage 156 and the passage 188 also flows by way of the passage 202 to the area on the face of the diaphragm 192 of the timing valve device 19 within the seat rib 200, while the fluid under pressure supplied to the passage 169 from the inshot valve device 140 flows through the choke 204 to the area on the face of the diaphragm 192 outwardly of the seat rib 200.

The diaphragm 192 will be held by the fluid under pressure in the chamber 194 in a position in which the sealing gasket 198 engages the seat rib 200, however, so that ordinarily during service applications of the brakes there will be no communication between the areas on the opposite sides of the seat rib 200.

If after the pressure of the fluid in the brake pipe 1 has been reduced to the desired extent, the engineer's brake valve is turned to the lap position to cut off the further venting of fluid from the brake pipe and to maintain the pressure of the fluid in this pipe, the emergency valve device provided by this invention will operate as described in detail above to release fluid under pressure from the chamber 32 and the quick action chamber 38 until the pressure of the fluid in these chambers is reduced substantially to the pressure in the chamber 26.

When the pressure of the fluid in the chamber 32 and the chamber 38 has been reduced to the pressure of the fluid in the chamber 26, or slightly below the pressure in the chamber 26, the diaphragm 12 is returned to the normal release position, and the stem 20 is moved so as to move the poppet valve device 60 so that the valve 72 thereof engages its seat to cut off the release of fluid from the chamber 32.

On a subsequent increase in the pressure of the fluid in the brake pipe 1 to effect the release of the brakes, the service portion of the brake controlling valve device 5 operates in the manner described in detail in the above identified patent to release fluid under pressure from the brake cylinder 2, and to open a communication through which fluid under pressure will be supplied from the brake pipe 1 to the auxiliary reservoir 3.

On this increase in the pressure of the fluid in the brake pipe 1, there will be a corresponding increase in the pressure of the fluid in the chamber 26 on the face of the diaphragm 12.

By this increase in the pressure of the fluid in the chamber 26, the force exerted by the fluid under pressure in this chamber will be increased above the opposing force of the springs 74 and 185 together with the fluid under pressure in the chamber 32 acting on the opposite face of the diaphragm, and the diaphragm 12 and the stem 20 will be moved to the left, as viewed in Fig. 1 of the drawing, to the inner release position, while the valve device 24 will be moved so as to move the valve 72 of the poppet valve device 60 to the seated position to cut off the release of fluid under pressure from the chamber 32, if the valve 72 is not already in this position.

On further movement of the stem 20 subsequent to engagement of the valve 72 with its seat, the spring 56 will be compressed and the seat on the stem 20 will be moved away from the valve 48, thereby opening communication between the chamber 40 and the chamber 32 through the passages 50, and fluid under pressure supplied from the brake pipe 1 to the chamber 26 may flow therefrom at a restricted rate through the restricted passage 44 to the chamber 40, and then to the chamber 32 to increase the pressure of the fluid in this chamber and in the quick action chamber 38.

On this movement of the stem 20 the rocker arm 234 is moved in a clockwise direction, as viewed in Fig. 1 of the drawing, while the end 254 of the arm 252 of the rocker arm 250 presses against the end of the stem of the poppet valve 184 and moves it farther away from its seat against the spring 185 associated therewith.

After a time interval the pressure of the fluid in the chamber 32, and in the quick action chamber 38, will be increased by the flow of fluid thereto from the chamber 26 through the restricted passage 44 and the passages 50 to substantially the pressure of the fluid in the chamber 26 on the opposite face of the diaphragm 12.

When the pressure of the fluid in the chamber 32 has increased substantially to this value, the stem 20 and the diaphragm 12 will be moved from the inner release position by the spring 56 assisted by the springs 74 and 185 to a position in which the seat on the stem 20 engages the valve 48 so as to cut off the flow of fluid from the chamber 40 to the chamber 32, thereby cutting off the increase in the pressure of the fluid in the chamber 32 and in the quick action chamber 38.

When the spring 56 has expanded far enough to move the seat on the stem 20 into engagement with the valve 48 the spring 56 is no longer effective to urge the diaphragm 12 and the stem 20 to move to the right as viewed in Fig. 1 of the drawing.

On this movement of the stem 20, the rocker arm 234 is moved in a counterclockwise direction, as viewed in Fig. 1 of the drawing, while the arm 252 of the rocker arm 250 is also moved in a counterclockwise direction, thereby permitting the spring 185 to move the poppet valve 184 towards its seat, but the amount of movement permitted the valve 184 is insufficient to permit the valve 184 to be moved to the seated position.

On an increase in the pressure of the fluid in the chamber 32 fluid will flow therefrom through the passages 54 to the chamber 52 within the stem 20, and therefrom through the passages 66 through the valve device 24 to the chamber 62, from which it will flow by way of the passage 196 to the chamber 194 on the face of the diaphragm 192 of the timing valve device 190 to increase the pressure of the fluid in this chamber to the pressure present in the chamber 32.

On the release of fluid under pressure from the passage 156 and the brake cylinder 2 fluid under pressure in the chamber 172 on the spring side of the inshot valve piston 158 will flow to the passage 156 by way of the passage 174, the chamber 178, through the passage controlled by the poppet valve 184 to the chamber 186, and then by way of the passage 188 to the passage 156 leading to the service portion of the brake controlling valve device.

On a reduction in the pressure of the fluid in the brake pipe 1 at an emergency rate, the service portion of the brake controlling valve device 5 operates in the manner described in detail in the above identified patent to supply fluid under pressure from the auxiliary reservoir 3 to the passage 156 leading to the brake cylinder 2.

In addition, on a reduction in the pressure of the fluid in the brake pipe at an emergency rate there will be a rapid reduction in the pressure of the fluid in the chamber 26 on the face of the diaphragm 12.

On this rapid reduction in the pressure of the fluid in the chamber 26 the fluid under pressure in the chamber 32 on the opposite face of the diaphragm 12 assisted by the springs 74 and 185 will cause the diaphragm 12 to move to the right, as viewed in Fig. 1 of the drawing, thereby moving the stem 20 to the right. At this time the seat on the stem 20 is engaged by the valve 48 associated with the valve device 24, and on this movement of the stem 20 the valve device 24 is moved so as to permit the valve 72 of the poppet valve device 60 to be moved away from its seat by the spring 74 and thereby release fluid under pressure from the chamber 32 by way of the chamber 64 and the restricted port 68

The rate of flow of fluid from the chamber 32 through the restricted port 68 is such, however, that the pressure of the fluid in the chamber 32 and the quick action chamber 38 cannot be reduced as rapidly as the pressure of the fluid in the chamber 26 is reduced on a reduction in the pressure of the fluid in the brake pipe at an emergency rate.

As a result, therefore, the differential of pressures between the pressure of the fluid in the chamber 32 and in the chamber 26 on opposite sides of the diaphragm 12 will increase, and the force exerted by the fluid under pressure in the chamber 32 on the diaphragm 12, together with the force exerted by the springs 74 and 185, will exceed the force exerted by the fluid under pressure in the chamber 26 by an amount sufficient to overcome the force exerted by the spring 90 through the valve 88 and opposing movement of the stem 20 and the diaphragm 12 by the fluid under pressure in the chamber 32.

The valve 88 will, therefore, be moved by the arm 242 of the rocker arm 234 against the spring 90 away from its seat and fluid under pressure may thereupon flow from the chamber 32 to the chamber 86, and thence by way of the passage 84 to the chamber 82 on the face of the vent valve piston 80.

The poppet valve device 60 and the other portions of the emergency valve device provided by this invention are arranged and proportioned so that the valve 70 of the poppet valve device 60 will not be moved into engagement with its seat until after a limited amount of movement of the stem 20 beyond the point at which the arm 242 of the rocker arm 234 engages the end of the stem of the valve 88. The poppet valve device 60, therefore, will not be operated to cut off the release of fluid under pressure from the chamber 32 until the valve 88 is opened to supply fluid under pressure to the chamber 82 on the face of the vent valve piston 80, but it will be operated to cut off the release of fluid under pressure from the chamber 32 immediately after the valve 88 is opened.

On further movement of the stem 20 to the right, as viewed in Fig. 1 of the drawing, after engagement of the valve 70 of the poppet valve device 60 with its seat the valve device 24 moves away from the valve 72 of the poppet valve device 60, so that the spring 74 does not exert any force on the stem 20.

The various parts of the emergency valve device provided by this invention are also arranged and proportioned so that the poppet valve 184 is held out of engagement with its seat until after the arm 242 of the rocker arm 234 engages the end of the stem of the valve 88. The valve 184 is moved to the seated position by the spring 185 upon a limited amount of movement of the stem 20 beyond the point at which the arm 242 of the rocker arm 234 engages the end of the stem of the valve 88 so that the valve 184 permits fluid under pressure supplied to the brake cylinder 2 to flow to the chamber 172 on the spring side of the inshot valve piston 158 until the diaphragm 12 and the stem 20 have moved beyond the zone in which their movement is not opposed by the spring 90 associated with the valve 88.

This insures that fluid under pressure will be supplied to the spring side of the inshot valve piston 158 during service applications of the brakes so as to prevent operation of inshot valve mechanism to limit the rate of flow of fluid to the brake cylinder.

This arrangement also insures that the valve 184 will be moved to the seated position to cut off the supply of fluid under pressure to the spring side of the inshot valve piston 158 on movement of the diaphragm 12 and the stem 20 to a position to effect an emergency application of the brakes so that the inshot valve mechanism will operate, as will hereafter more fully appear, to limit the rate of flow of fluid to the brake cylinder.

On movement of the valve 88 against the spring 90 away from its seat, fluid under pressure flows from the chamber 32 to the chamber 86 and thence by way of the passage 84 to the chamber 82 on the face of the vent valve piston 80. The rate of supply of fluid under pressure to the chamber 82 substantially exceeds the rate at which fluid under pressure may flow from the chamber 82 through the restricted passage 96 through the piston 80, and through the groove 94 around the piston, and as a result there will be a rapid increase in the pressure of the fluid in the chamber 82.

On this increase in the pressure of the fluid in the chamber 82 the force exerted by the fluid under pressure in this chamber exceeds the opposing force of the spring 114 and of the fluid under pressure in the chamber 108 operating through the valve 106 and opposing movement of the vent valve piston 80.

As a result of this increase in the pressure of the fluid in the chamber 82 the vent valve piston 80 will be moved to the right, as viewed in Fig. 1 of the drawing, so that the face thereof engages the rib 100 on the gasket 98 to cut off the flow of fluid around the periphery of the piston to the passage 92 leading to the atmosphere.

On this movement of the vent valve piston 80 the vent valve 106 is moved against the spring 114 so that the sealing gasket 110 is moved away from the seat rib 112, thereby permitting fluid under pressure in the chamber 108 to escape to the atmosphere past the seat rib 112 and through the passage 92.

Fluid under pressure is supplied to the chamber 108 from the brake pipe 1 through the branch pipe 30, the passages 28 and 122 in the pipe bracket section 7, the chamber 120 and the passage 118.

On movement of the vent valve 106 away from the seat rib 112, therefore, fluid under pressure is vented from the brake pipe 1 at a rapid rate and there will be a rapid reduction in the pressure of fluid in the brake pipe 1, and also in the chamber 26 on the face of the diaphragm 12.

As a result of the rapid reduction in the pressure of the fluid in the chamber 26 there will be a corresponding decrease in the force exerted by this fluid on the diaphragm 12 in opposition to the force exerted on this diaphragm by the fluid under pressure in the chamber 32. There will, therefore, be a rapid increase in the force exerted on the diaphragm 12 and tending to move it to the right, as viewed in Fig. 1 of the drawing, and it will move in this direction very rapidly. The diaphragm 12 may continue to move in this direction until its movement is limited by engagement of the member 42 with the pipe bracket section 7.

On this movement of the diaphragm 12 the stem 20 is moved so as to move the rocker arm 234 in a counterclockwise direction, as viewed in Fig. 1 of the drawing, thereby pressing the arm 242 against the end of the stem of the valve 88 and moving this valve farther away from its seat against the spring 90.

In addition, on this movement of the stem 20, the end 254 of the arm 252 of the rocker arm 250 will be moved in a counter-clockwise direction, as viewed in Fig. 1 of the drawing, and it will engage the valve 220 and move this valve away from its seat against the spring 224.

The various parts of the emergency valve device provided by this invention are arranged and proportioned so that the end 254 of the arm 252 of the rocker arm 250 will not engage the valve 220 until after the arm 242 of the rocker arm 234, has engaged the end of the stem of the valve 88 and moved this valve away from its seat so as to supply fluid under pressure from the chamber 32 to the chamber 82 on the face of the vent valve piston 80. The valve 220 and the spring 224, therefore, will not oppose movement of the diaphragm 12 and the stem 20 to the position to open the valve 88 to supply fluid under pressure to the vent valve piston.

On movement of the valve 220 away from its seat fluid under pressure from the emergency reservoir 4 supplied by way of the pipe and passage 136 to the chamber 222 will flow past the valve 220 to the chamber 186, from which it flows by way of the passage 188 to the passage 156 leading into the chamber 144 of the inshot valve device 140.

In addition, the fluid under pressure supplied to the chamber 186, will flow therefrom by way of the passage 202 to the area within the seat rib 200 on the face of the sealing gasket 198 of the timing valve device 190. On the initial supply of fluid under pressure to the area within the seat rib 200 the sealing gasket 198 will be held in engagement with the seat rib 200 as the pressure of the fluid in the chamber 194 on the opposite face of the diaphragm 192 will be at a relatively high value and will exert a relatively great amount of force tending to hold the sealing gasket in engagement with the seat rib 200.

On the supply of fluid under pressure from the auxiliary reservoir 3 and the emergency reservoir 4 to the chamber 144 of the inshot valve device 140 fluid will flow past the unseated valve 142 to the passage 152 and to the chamber 150. Fluid under pressure supplied to the chamber 150 will flow therefrom to the chamber 164 on the face of the piston 158 and by way of the passage and pipe 169 to the brake cylinder 2.

When the pressure of the fluid in the brake cylinder 2 has increased to a predetermined value the force exerted by the fluid under pressure in the chamber 164 on the piston 158, together with the force exerted by the spring 148 acting through the valve 142, will be sufficient to overcome the opposing force of the spring 180, and the piston 158 will be moved to the left, as viewed in Fig. 1 of the drawing, against the spring 180, so that the seat rib 166 on the piston 158 engages the sealing gasket 168 to prevent the flow of fluid from the chamber 164 to the chamber 172 on the spring side of the piston 158.

On this movement of the piston 158 the stem 170 is moved to a position to permit the valve 142 to be moved by the spring 148 into the engagement with the seat rib 146, thereby cutting off the flow of fluid from the chamber 144 through the passage 152 to the chamber 150 and thence to the brake cylinder.

On movement of the valve 142 to the seated position fluid under pressure continues to flow from the chamber 144 through the restricted passage 154 to the chamber 150 at a restricted rate. The pressure of the fluid in the brake cylinder 2 will thereafter be increased at a slower rate than occurred on the initial supply of fluid under pressure to the brake cylinder.

The fluid under pressure which is supplied to the chamber 82 on the face of the vent valve piston 80 escapes therefrom through the restricted passage 96 to the passage 92 which communicates with the atmosphere. As a result of the gradual release of fluid under pressure through the passage 96 there will be a gradual reduction in the pressure of the fluid in the chamber 32, in the quick action chamber 38 and in the chamber 82.

The passage 96 is proportioned, however, so that the rate of flow of fluid through this passage is such that the vent valve 106 will be held away from the seat rib 112 against spring 114 for a period of time long enough to permit the pressure of the fluid in the brake pipe 1 to be reduced substantially to atmospheric pressure.

When the pressure of the fluid in the chamber 82 on the face of the vent valve piston 80, and in the chamber 32 and the quick action chamber 38, has been reduced to a predetermined relatively low value, the spring 114 will move the vent valve 106 to the left, as viewed in Fig. 1 in the drawing, so that the sealing gasket 110 again engages the seat rib 112 to cut off communication between the chamber 108 and the atmosphere passage 92.

On this movement of the vent valve 106 the piston 80 is moved away from the rib 100 on the gasket 98 and is returned to the position in which the groove 94 establishes communication around the piston 80 so that any fluid under pressure remaining in the chamber 82 may escape therefrom at a rapid rate through the groove 94 to the chamber on the opposite face of the piston and thence to the atmosphere by way of the passage 92.

As the pressure of the fluid in the chamber 32 is reduced there will be a corresponding reduction in the pressure of the fluid in the chamber 194 on the face of the diaphragm 192 of the timing valve device 190, and a corresponding reduction in the force exerted by this fluid under pressure on the diaphragm 192 and tending to maintain the sealing gasket 198 in engagement with the seat rib 200.

At the same time, as a result of the gradual increase in the pressure of the fluid in the brake cylinder 2, there will be a gradual increase in the pressure of the fluid in the chambers on the opposite face of the diaphragm 192 and the force exerted by the constantly increasing pressure in these chambers will eventually overcome the opposing force of the fluid in the chamber 194 which is constantly decreasing in pressure.

When this occurs the diaphragm 192 will be moved so as to move the sealing gasket 198 away from the seat rib 200 so that thereafter fluid under pressure supplied to the passage 156 from the auxiliary reservoir 3, and from the emergency reservoir 4 to the chamber 186 and thence to the passage 202, can flow past the seat rib 200, and through the choke or restricted passage 204 to the passage 169 leading to the brake cylinder. This will result in an increased rate of flow of fluid to the brake cylinder, and fluid under pressure will continue to flow to the brake cylinder from the auxiliary reservoir 3 and the emergency reservoir 4 until the pressures in these reservoirs and in the brake cylinder equalize.

When the pressure of the fluid in the chamber 32 has been reduced to a very low value by the venting of fluid under pressure therefrom through the restricted passage 96 through the vent valve piston 80 or through the groove 94 around the vent valve piston 80, the force exerted by the fluid under pressure in the chamber 32 on the diaphragm 12 is insufficient to hold the diaphragm against the opposing force of the spring 90 acting through the valve 88 and the arm 242 of the rocker arm 234, and the spring 224 acting through the valve 220 and the arm 252 of the rocker arm 250. As a result the springs 90 and 224 will move the valves 88 and 220, respectively, towards their seats, thereby causing the diaphragm 12 to be moved a short distance to the left from the application position towards the normal release position.

On movement of the valve 220 to the seated position the spring 224 is no longer effective to exert any force on the arm 252 on the rocker arm 254, and thereafter the stem 20 is subject only to the force exerted by the spring 90 operating through the poppet valve 88 and the arm 242 of the rocker arm 234.

On movement of the stem 20 and the diaphragm 12 away from emergency application position subsequent to engagement of the valve 220 with its seat, the end 254 of the arm 252 of the rocker arm 250 engages the end of the stem of the valve 184 which is held in the seated position by the spring 185 so that further movement of the stem 20 and the diaphragm 12 by the spring 90 operating through the valve 88 is opposed by the spring 185 operating through the valve 184.

The springs 185 and 90 are proportioned so that the spring 90 is unable to overcome the spring 185, and as a result the valve 184 is held in the seated position by the spring 185, while the valve 88 is held away from its seat by the arm 242 of the rocker arm 234.

As the valve 88 is held in the open position any fluid under pressure remaining in the chamber 32 may escape to the atmosphere through the chamber 86, the passage 84 and the chamber 82 which is open to the atmosphere through the groove 94.

As the valve 184 is held in the seated position by the spring 185, fluid under pressure in the chamber 186, which communicates with the brake cylinder 2 by way of the passages 188 and 156 and the inshot valve device 140, cannot flow to the chamber 178 from which it could flow by way of the passage 174 and the inshot piston volume 176 to the passage 208 and past the accelerated release check valves 218 and 210 to the brake pipe 1.

On a subsequent increase in the pressure of the fluid in the brake pipe 1 to effect the release of the brakes, there will be a corresponding increase in the pressure of the fluid in the chamber 26 on the face of the diaphragm 12. On an increase in the pressure of the fluid in the chamber 26, fluid under pressure will flow therefrom through the restricted passage 44 to the chamber 40 within the stem 20. The valve 48 of the valve device 24 is in engagement with its seat at this time, however, so that fluid under pressure cannot flow from the chamber 40 through the passages 50 to the chamber 32.

On an increase in the pressure of the fluid in the chamber 26 on the face of the diaphragm 12 this fluid exerts a force on the diaphragm 12 tending to move this diaphragm and the stem 20 to the left, as viewed in Fig. 1 of the drawing. This movement of the diaphragm 12 and the stem 20 is opposed by the spring 185 operating through the valve 184 and the arm 252 of the rocker arm 250.

When the pressure of the fluid in the chamber 26 has increased to a predetermined value the force exerted by this fluid on the diaphragm 12 is sufficient to overcome the opposing force of the spring 185, and the diaphragm 12 and the stem 20 will be moved away from the emergency application position, while the arm 252 of the rocker arm 250 will press against the end of the stem of the valve 184 and move this valve away from its seat against the spring 185. In addition on this movement of the diaphragm 12 and the stem 20 the rocker arm 234 is moved in a clockwise direction so that the arm 242 of the rocker arm 234 moves away from the end of the stem of the valve 88 and permits this valve to be moved to the seated position by the spring 90.

The movement of the stem 20 is transmitted through the spring 56 to the valve device 24 which presses against the valve 72 of the poppet valve device 60 and moves this valve device against the spring 74 so the valve 72 is moved into engagement with its seat to cut off communication between the chamber 32 and the atmosphere by way of the chamber 64 and the passage 68.

After the stem 20 has moved far enough from the application position towards the normal or release position to move the valve 72 of the poppet valve device 60 into engagement with its seat further movement of the valve device 24 is prevented, while movement of the stem 20 relative to the valve device 24 is opposed by the spring 56.

On movement of the valve 184 away from its seat the fluid under pressure present in the chamber 186, which communicates with the brake cylinder 2 through the timing valve device 190 and the inshot valve device 140, will flow therefrom to the chamber 178 and thence by way of the passage 174 to the inshot piston volume 176. Fluid under pressure supplied to the inshot piston volume 176 will flow therefrom through the passage 208 and past the ball check valve 218 to the chamber 216 within the seat rib 214, and on an increase in the pressure of the fluid in the chamber 216 to a predetermined value the accelerated release check valve 210 will be moved away from the seat rib 214 against the spring 212, and fluid under pressure will thereupon flow to the chamber 120 and thence by way of the passages 122 and 28 to the chamber 26 on the face of the diaphragm 12, and to the branch pipe 30 leading to the brake pipe 1.

The pressure of the fluid in the brake cylinder 2 is at a relatively high value at this time, while the pressure of the fluid in the brake pipe 1 is at a relatively low value so that the fluid under pressure supplied by way of the passage 208 to the chamber 216 beneath the accelerated release check valve 210 is able to move this valve away from its seat against the spring 212, and fluid under pressure will be supplied from the brake cylinder 2 to the brake pipe 1 to increase the pressure of the fluid in the brake pipe, and in the chamber 26 on the face of the diaphragm 12, so that a local increase in brake pipe pressure is effected, which accelerates the release action throughout the train.

In addition, the auxiliary reservoir 3 is in communication with the brake cylinder 2 at this time through a port in the service portion of the brake controlling valve device 5 so that fluid under pressure will flow from the auxiliary reservoir 3, as well as from the brake cylinder 2, to the brake pipe 1.

When the pressure of the fluid in the brake cylinder 2 and the auxiliary reservoir 3 and in the brake pipe 1 have substantially equalized by the flow of fluid under pressure from the brake cylinder and the auxiliary reservoir to the brake pipe, the accelerated release check valve 210 is moved into engagement with the seat rib 214 by the spring 212 so as to cut off the further flow of fluid under pressure from the brake cylinder and the auxiliary reservoir to the brake pipe, and to prevent back flow of fluid from the brake pipe to the brake cylinder and to the auxiliary reservoir.

Fluid under pressure supplied to the chamber 178 also flows therefrom through the passage 174 to the chamber 172 on the spring side of the piston 158 of the inshot valve device 140, and when the pressure of the fluid in this chamber has increased to a predetermined value the inshot valve piston 158 will be moved by the spring 180 away from the sealing gasket 168 and into engagement with the seat rib 162. On this movement of the piston 158 the stem 170 moves the valve 142 away from the seat rib 146 against the spring 148.

As the pressure of the fluid in the chamber 26 builds up the diaphragm 12 and the stem 20 will be moved to the left, as viewed in Fig. 1 of the drawing, relative to the valve device 24 to the inner release position and the spring 56 will be compressed, while the seat on the stem 20 will be moved away from the valve 48 associated with the valve device 24 so that fluid under pressure supplied from the brake pipe 1 to the chamber 40 may flow therefrom to the chamber 32 and from this chamber through the passage 36 to the quick action chamber 38.

Fluid under pressure will be supplied to the chamber 32 and to the quick action chamber 38 from the chamber 26 only at a restricted rate because of the restricted flow capacity of the passage 44 through which fluid under pressure flows from the chamber 26 to the chamber 40. As a result, therefore, the pressure of the fluid in the chambers 32 and 38 will increase at a slow rate.

After a time interval the pressure of the fluid in the chambers 32 and 38 will have increased substantially to the pressure of the fluid in the chamber 26 and the stem 20 will thereupon be moved by the spring 56, assisted by the spring 185, from the inner release position to the normal release position so that the seat on the stem 20 engages the valve 48 associated with the valve device 24 to cut off the flow of fluid from the chamber 40 to the chamber 32 and to the quick action chamber 38.

On this movement of the stem 20 the rocker arm 234 will be moved in a counterclockwise direction a small distance, but it will not be moved far enough so that the arm 242 on the rocker arm 234 will engage the end of the stem of the poppet valve 88 and move this valve away from its seat against the spring 90.

In addition, on this movement of the stem 20 the arm 252 on the rocker arm 250 will also be moved a short distance in a counterclockwise direction, thereby permitting the valve 184 to be moved towards its seat by the spring 185, but the amount of movement of the arm 252 is insufficient to permit the valve 184 to be moved to the seated position.

If for any reason the pressure of the fluid in the chamber 32 is increased to a value exceeding that in the emergency reservoir 4 by a predetermined amount, as may occur on a rapid increase in the pressure of the fluid in the brake pipe, fluid under pressure from the chamber 32 will flow past the ball check valve 134 to the chamber 132 within the seat rib 130, and it will move the spill-over check valve 126 away from the seat rib 130 against the spring 128, so that fluid under pressure may flow to the chamber 114 and thence by way of the passage and pipe 136 to the emergency reservoir 4.

When the pressure of the fluid in the chamber 32 has reduced substantially to the pressure in the emergency reservoir 4 the spill-over check valve 126 will be moved by the spring 128 into engagement with the seat rib 130 to cut off the flow of fluid from the chamber 32 to the emergency reservoir 4.

On an increase in the pressure of the fluid in the chamber 32 there will be a corresponding increase in the pressure of the fluid in the chamber 194 on the face of the diaphragm 192 of the timing valve device 190, and the fluid under pressure in this chamber operating through the diaphragm 192 will press the sealing gasket 198 against the seat rib 200.

When the pressure of the fluid in the brake pipe 1 has been increased to a predetermined value so as to exceed the pressure of the fluid in the auxiliary reservoir 3, the service portion of the brake controlling valve device operates as described in detail in the above identified patent to release fluid under pressure from the brake cylinder 2, and to open a communication through which fluid under pressure may be supplied from the brake pipe 1 to the auxiliary reservoir 3 to charge this reservoir under pressure, and through which fluid under pressure may also be supplied to the emergency reservoir 4.

While one embodiment of the brake controlling valve device provided by this invention has been illustrated and described in detail, it should be understood that the invention is not limited to these details of construction, and numerous changes and modifications may be made without departing from the scope of the following claims.

Having now described my invention, what I claim as new and desire to secure by Letters Patent, is:

1. In a fluid pressure brake equipment, in combination, a brake pipe, and an emergency valve device comprising a movable abutment subject to the opposing pressures of the fluid in the brake pipe and of the fluid in a pressure chamber, a poppet valve controlled by said abutment and controlling a passage through which fluid under pressure may be supplied from the brake pipe to the pressure chamber, and yielding resistance means opposing movement of the abutment to effect operation of said poppet valve to open communication through the passage controlled thereby.

2. In a fluid pressure brake equipment, in combination, a brake pipe, and an emergency valve device comprising a movable abutment subject to the opposing pressures of the fluid in the brake pipe and of the fluid in a pressure chamber, a poppet valve operated by said abutment and controlling a passage through which said pressure chamber may be supplied with fluid under pressure from the brake pipe, and a poppet valve device controlled by said abutment and controlling a passage through which fluid under pressure may be released from the pressure chamber.

3. In a fluid pressure brake equipment, in combination, a brake pipe, and an emergency valve device comprising a movable abutment subject to the opposing pressures of the fluid in the brake pipe and of the fluid in a pressure chamber, a poppet valve operated by said abutment and controlling a passage communicating with the brake pipe and the pressure chamber, and a poppet valve device controlled by said abutment and controlling a passage through which fluid under pressure may be released from the pressure chamber at a restricted rate.

4. In a fluid pressure brake equipment, in combination, a brake pipe, and an emergency valve device comprising a movable abutment subject to the opposing pressures of the fluid in the brake pipe and of the fluid in a pressure chamber, a poppet valve operated by said abutment and controlling a passage communicating with the brake pipe and the pressure chamber, and a poppet valve device controlled by the abutment through said poppet valve and controlling a passage through which fluid under pressure may be released from the pressure chamber.

5. In a fluid pressure brake equipment, in combination, a brake pipe, and an emergency valve comprising a movable abutment subject to the opposing pressures of the fluid in the brake pipe and of the fluid in a pressure chamber, a valve device associated with said abutment, the valve device being movable with the abutment and being movable relative thereto, the valve device comprising a poppet valve operated on movement of the abutment relative to the valve device to open a passage communicating with the brake pipe and the pressure chamber, and a poppet valve operated on movement of the valve device with the abutment to open a passage through which fluid may be released from the pressure chamber.

6. In a fluid pressure brake equipment, in combination, a brake pipe, and an emergency valve comprising a movable abutment subject to the opposing pressures of the fluid in the brake pipe and of the fluid in a pressure chamber, a valve device associated with said abutment, the valve device being movable with the abutment and being movable relative thereto, the valve device comprising a poppet valve operated on movement of the abutment relative to the valve device to open a passage communicating with the brake pipe and the pressure chamber, a poppet valve operated on movement of the valve device with the abutment to open a passage through which fluid may be released from the pressure chamber, and yielding resistance means opposing relative movement of the abutment and the valve device.

7. In a fluid pressure brake equipment, in combination, a brake pipe, and an emergency valve comprising a movable abutment subject to the opposing pressures of the fluid in the brake pipe and of the fluid in a pressure chamber, a valve device associated with the abutment, the valve device being movable with the abutment and being movable relative to the abutment, the valve device comprising a poppet valve operated by movement of the abutment relative to the valve device to open a passage communicating with the brake pipe and with the pressure chamber, and poppet valve means operated on initial movement of the valve device by the abutment to open a passage through which fluid may be released from the pressure chamber and operated on further movement of the valve device by the abutment to cut off communication through said passage.

8. In a fluid pressure brake equipment, in combination, a brake pipe, and an emergency valve comprising a movable abutment subject to the opposing pressures of the fluid in the brake pipe and of the fluid in a pressure chamber, and a valve device associated with the abutment, the valve device being movable with the abutment and being movable relative to the abutment, the valve device comprising a poppet valve operated by movement of the abutment relative to the valve device to open a passage communicating with the brake pipe and with the pressure chamber, poppet valve means operated on initial movement of the valve device by the abutment to open a passage through which fluid may be released from the pressure chamber and operated on further movement of the valve device by the abutment to cut off communication through said passage, and yielding resistance means opposing relative movement between the abutment and the valve device.

9. In a fluid pressure brake equipment, in combination, a brake pipe, a brake cylinder, a reservoir, a vent valve device operated upon the supply of fluid under pressure thereto to vent fluid from the brake pipe, a movable abutment subject to the opposing pressures of the fluid in the brake pipe and of the fluid in a pressure chamber, a poppet valve operated by said abutment and controlling a passage through which fluid under pressure may be supplied to the vent valve device, and a poppet valve operated by said abutment and controlling a communication through which fluid under pressure is supplied from the reservoir to the brake cylinder.

10. In a fluid pressure brake equipment, in combination, a brake pipe, a brake cylinder, a reservoir, a vent valve device operated on the supply of fluid under pressure thereto to vent fluid from the brake pipe, a movable abutment subject to the opposing pressures of the fluid in the brake pipe and of the fluid in a pressure chamber, a poppet valve operated by said abutment and controlling communication through which fluid under pressure is supplied from the pressure chamber to the vent valve device, and a poppet valve operated by said abutment and controlling a communication through which fluid under pressure is supplied from the reservoir to the brake cylinder.

11. In a fluid pressure brake equipment, in combination, a brake pipe, a reservoir, a brake cylinder, a vent valve operated on the supply of fluid under pressure thereto to vent fluid from the brake pipe, a movable abutment subject to the opposing pressures of the fluid in the brake pipe and of the fluid in a pressure chamber, the abutment having a normal position and being movable therefrom in response to changes in the pressures of the fluid operating thereon, a poppet valve controlling a passage through which fluid may be supplied to the vent valve, said poppet valve being operated to open communication through the passage on movement of the abutment a given distance from the normal position, and a poppet valve operated by said abutment and controlling a passage communicating with the reservoir and with the brake cylinder, said valve being operated to open communication through said passage only after movement of the abutment from the normal position a distance greater than said given distance.

12. In a fluid pressure brake equipment, in combination, a brake pipe, a reservoir, a brake cylinder, a vent valve operated on the supply of fluid under pressure thereto to vent fluid from the brake pipe, a movable abutment subject to the opposing pressures of the fluid in the brake pipe and of fluid in a pressure chamber, the abutment having a normal position and being movable therefrom in response to changes in the pressures of the fluid operating thereon, a poppet valve controlling a passage through which fluid may be supplied to the vent valve, said poppet valve being operated to open communication through said passage on movement of the abutment a given distance from the normal position, a poppet valve operated by said abutment and controlling a passage communicating with the reservoir and with the brake cylinder, said valve being operated to open communication through said passage only after movement of the abutment from the normal position a distance greater than said given distance, and yielding resistance means operating through the first-named poppet valve and opposing movement of the abutment away from the normal position.

13. In a fluid pressure brake equipment, in combination, a brake pipe, a reservoir, a brake cylinder, a vent valve operated on the supply of fluid under pressure thereto to vent fluid from the brake pipe, a movable abutment subject to the opposing pressures of the fluid in the brake pipe and of the fluid in a pressure chamber, the abutment having a normal position and being movable therefrom in response to changes in the pressures of the fluid operating thereon, a poppet valve controlling a passage through which fluid may be supplied to the vent valve, said poppet valve being operated to open communication through said passage on movement of the abutment a given distance from the normal position, a poppet valve operated by said abutment and controlling a passage communicating with the reservoir and with the brake cylinder, said valve being operated to open communication through said passage only after movement of the abutment from the normal position a distance greater than said given distance, and yielding resistance means opposing movement of the first-named poppet valve to open communication through the passage controlled thereby.

14. In a fluid pressure brake equipment, in combination, a brake pipe, a vent valve operated on the supply of fluid under pressure thereto to vent fluid from the brake pipe, a movable abutment subject to the opposing pressures of the fluid in the brake pipe and of the fluid in a pressure chamber, the abutment being movable between a release position and an application position, a poppet valve operated by the abutment on movement from the release position to the application position to open communication through a passage through which fluid under pressure may be supplied to the vent valve, and a spring operating through said poppet valve and opposing movement of the abutment to the application position.

15. In a fluid pressure brake equipment, in combination, a brake pipe, a vent valve operated on the supply of fluid under pressure thereto to vent fluid under pressure from the brake pipe, a movable abutment subject to the opposing pressures of the fluid in the brake pipe and of the fluid in a pressure chamber, the abutment being movable between a normal position and an application position, valve means operated by said abutment and controlling a passage through which fluid under pressure may be released from the pressure chamber, the valve means being conditioned to cut off communication through said passage when the abutment is in the normal position or in the application position and being conditioned to open communication through said passage when the abutment is intermediate the normal and application positions, a poppet valve operated by said abutment on movement to the application position to open communication through a passage through which fluid under pressure may be supplied to the vent valve, and a spring operating through said poppet valve and yieldingly opposing further movement of the abutment after a given amount of movement of the abutment from the normal position towards the application position.

16. In a fluid pressure brake equipment, in combination, a brake pipe, a brake cylinder, an emergency reservoir, and an emergency valve device comprising a movable abutment subject to the opposing pressures of the fluid in the brake pipe and of the fluid in a pressure chamber, an inshot valve device subject to the opposing pressures of the fluid in an operating chamber and of the fluid supplied to the brake cylinder for regulating the rate of supply of fluid to the brake cylinder, a poppet valve operated by said abutment and controlling a communication through which fluid is supplied to said operating chamber, and a poppet valve operated by said abutment for controlling communication from the emergency reservoir to the brake cylinder.

17. In a fluid pressure brake equipment, in combination, a brake pipe, a brake cylinder, and an emergency valve device comprising a vent valve operative on the supply of fluid under pressure thereto to vent fluid from the brake pipe, an inshot valve device subject to the opposing pressures of the fluid supplied to the brake cylinder and of the fluid in an operating chamber, a poppet valve controlling the supply of fluid to said vent valve, a poppet valve controlling the supply of fluid to said operating chamber, and a movable abutment subject to the opposing pressures of the fluid in the brake pipe and in a pressure chamber and operative on a sudden reduction in the pressure of the fluid in the brake pipe to first open the poppet valve controlling the supply of fluid to the vent valve and to then permit the poppet valve controlling the supply of fluid to the operating chamber of the inshot valve device to seat.

18. In a fluid pressure brake, in combination, a brake pipe, a brake cylinder, an emergency valve device comprising a movable abutment subject to the opposing pressures of the brake pipe and a pressure chamber and valve means operated by said abutment upon a sudden reduction in brake pipe pressure for effecting an emergency application of the brakes, an inshot valve device subject to the opposing pressures of the brake cylinder and an operating chamber for regulating the rate of flow of fluid under pressure to the brake cylinder, valve means operable by said abutment and normally establishing communication from the brake cylinder to a passage which is constantly connected to the brake pipe and to said operating chamber to prevent the operation of said inshot valve device in effecting a service application of the brakes, said valve means being operated to close said communication upon movement of said abutment in effecting an emergency application of the brakes and to open said communication upon movement of said abutment upon an increase in brake pipe pressure after an emergency application to permit the venting of fluid from the brake cylinder to the brake pipe, and means for preventing back flow from the brake pipe to said passage.

19. In a fluid pressure brake, in combination, a brake pipe, a brake cylinder, a reservoir, and an emergency valve device comprising a movable abutment subject to the opposing pressures of the fluid in the brake pipe and of the fluid in a pressure chamber, means operated by said abutment for supplying fluid from the reservoir to the brake cylinder, an inshot valve device subject to the opposing pressures of the fluid supplied to the brake cylinder and of an operating chamber for regulating the rate of flow of fluid to the brake cylinder, valve means operated by said abutment for supplying fluid from the brake cylinder to a communication which is constantly connected to said operating chamber and to the brake pipe, and valve means for preventing back flow of fluid from the brake pipe to said communication.

20. In a fluid pressure brake equipment, in combination, a brake pipe, a brake cylinder, a reservoir, and an emergency valve device comprising a movable abutment subject to the opposing pressures of the fluid in the brake pipe and in an operating chamber, said abutment being movable between a normal position and an application position, means operated by the abutment on movement to the application position to supply fluid under pressure from the reservoir to the brake cylinder, an inshot valve device subject to the opposing pressures of the fluid supplied to the brake cylinder and of the fluid in an operating chamber for regulating the rate of supply of fluid to the brake cylinder, valve means controlled by said abutment and operative in the normal position of the abutment to supply fluid under pressure from the brake cylinder to a communication which is constantly connected to the brake pipe and to said operating chamber, said valve means being operative upon movement of the abutment to the application position to cut off the supply of fluid to said communication, and valve means for preventing back flow of fluid from the brake pipe to said communication.

21. In a fluid pressure brake, in combination, a brake pipe, a brake cylinder, a reservoir, and an emergency valve device comprising a movable abutment subject to the opposing pressures of the fluid in the brake pipe and of the fluid in a pressure chamber, said abutment being movable between a normal position and an application position, a vent valve operative upon an increase in fluid pressure to vent fluid from the brake pipe, means operative on movement of the abutment to the application position to supply fluid to said vent valve and to supply fluid from the reservoir to the brake cylinder, means yieldingly opposing movement of the abutment to the application position, an inshot valve device subject to the opposing pressures of the fluid supplied to the brake cylinder and of the fluid in an operating chamber for regulating the rate of supply of fluid to the brake cylinder, means controlled by the abutment and operative on movement of the abutment to the normal position to supply fluid from the brake cylinder to a communication which is constantly connected to the brake pipe and to said operating chamber, said means being operative on movement of the abutment to the operating position to cut off the supply of fluid to said communication, and a check valve for preventing back flow of fluid from the brake pipe to said communication.

22. In a fluid pressure brake equipment, in combination, a brake pipe, a brake cylinder, a reservoir, a movable abutment subject to the opposing pressures of the fluid in the brake pipe and of the fluid in a pressure chamber, said abutment being movable between a normal position and an application position, means operated by said abutment on movement to the application position to supply fluid from the reservoir to the brake cylinder, inshot valve means subject to the opposing pressures of the fluid supplied to the brake cylinder and of an operating chamber for regulating the supply of fluid to the brake cylinder, means controlled by said abutment and operative in the normal position thereof for supplying fluid under pressure from the brake cylinder to a communication which is constantly connected to said operating chamber and to the brake pipe, said means being operative in the application position of the abutment to cut off the supply of fluid to said communication, a check valve for preventing back flow of fluid from the brake pipe to said communication, and means yieldingly opposing movement of the abutment from the application position toward the normal position.

BURTON S. AIKMAN.